(12) United States Patent
Peng

(10) Patent No.: US 11,275,812 B2
(45) Date of Patent: Mar. 15, 2022

(54) REALTIME FEEDBACK-BASED WEB RESOURCE MANAGEMENT AND OPTIMIZATION SYSTEM

(71) Applicant: SAP SE, Walldorf (DE)

(72) Inventor: Yang Peng, Pleasanton, CA (US)

(73) Assignee: SAP SE, Walldorf (DE)

( * ) Notice: Subject to any disclaimer, the term of this patent is extended or adjusted under 35 U.S.C. 154(b) by 179 days.

(21) Appl. No.: 16/666,201

(22) Filed: Oct. 28, 2019

(65) Prior Publication Data

US 2021/0124792 A1    Apr. 29, 2021

(51) Int. Cl.
*G06F 16/958* (2019.01)
*G06F 16/957* (2019.01)
*G06F 16/955* (2019.01)

(52) U.S. Cl.
CPC ........ *G06F 16/9574* (2019.01); *G06F 16/958* (2019.01); *G06F 16/9566* (2019.01); *G06F 16/986* (2019.01)

(58) Field of Classification Search
CPC . G06F 16/9566; G06F 16/9574; G06F 16/986
See application file for complete search history.

(56) References Cited

U.S. PATENT DOCUMENTS

| | | | |
|---|---|---|---|
| 2016/0306895 A1* | 10/2016 | Kaewell | .................. H04L 67/02 |
| 2018/0246861 A1* | 8/2018 | Charron | ................ G06F 16/986 |
| 2019/0278928 A1* | 9/2019 | Rungta | .................... G06F 9/485 |
| 2020/0356618 A1* | 11/2020 | Shribman | ............... H04L 67/02 |

* cited by examiner

*Primary Examiner* — Robert W Beausoliel, Jr.
*Assistant Examiner* — Nirav K Khakhar
(74) *Attorney, Agent, or Firm* — Klarquist Sparkman, LLP

(57) ABSTRACT

Each of a plurality of resource files can be instrumented. Thereafter, usage data of the received files is received from a plurality of clients each executing a different instance of a web application. The usage data comprises is collected by the instances of the web application when being used by a respective one of a plurality of users. A dependencies list is then generated for the resource files based on the received usage data. In addition, a priorities list is generated for the resource files using the received usage data which indicates how frequently the resource files are being used. Further, groups of resource files are generated based on co-occurrence levels of the resource files in the dependencies list and the priorities list. Later, at least a portion of the groups of resource files are transmitted to the client for caching in a local cache pool. Related apparatus, systems, techniques and articles are also described.

19 Claims, 3 Drawing Sheets

REALTIME FEEDBACK-BASED WEB RESOURCE MANAGEMENT AND OPTIMIZATION SYSTEM

TECHNICAL FIELD

The subject matter described herein relates to a web resource management and optimization system that provides real-time feedback to reduce network latency.

BACKGROUND

Web-based applications use resources such as cascading style sheets (CSS) to control the presentation and layout of HTML elements on a webpage and/or JAVASCRIPT to control the behavior of different HTML elements. Every time a user visits a specific page, all of the utilized web resources may need to be downloaded. Depending on the complexity of a particular page, these web resources may comprise a large number of files (e.g., in excess of 50 files, etc.). Network latency may affect such downloading which, in turn, can cause a delay in particular information being rendered in the browser of the user.

SUMMARY

In a first aspect, each of a plurality of resource files can be instrumented. Thereafter, usage data of the received files is received from a plurality of clients each executing a different instance of a web application. The usage data comprises is collected by the instances of the web application when being used by a respective one of a plurality of users. A dependencies list is then generated for the resource files based on the received usage data. In addition, a priorities list is generated for the resource files using the received usage data which indicates how frequently the resource files are being used. Further, groups of resource files are generated based on co-occurrence levels of the resource files in the dependencies list and the priorities list. Later, at least a portion of the groups of resource files are transmitted to the client for caching in a local cache pool.

The resource files can comprise various files including, without limitation, JAVASCRIPT files and/or cascading style sheet (CSS) files.

The groups of resources files that correspond to a page being rendered in the web application can be loaded. These resource files can be cached in a local cache pool so that resource files required for a subsequently rendered pages are obtained from the local cache pool when present.

Each method used by the application can be tagged with a tag that identifies, when the method is being executed, which resource file is being utilized by the method and which web application is using such method. A resource identifier can be added to each page utilized by the web application. The resource identifier identifies which group of resource files are required to render the page.

Names of the groups of resource files can be published using a Uniform Resource Locator (URL). The usage data can be continually received such that the groupings are updated based on subsequently received usage data.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows for reduced network latency which, in turn, allows for more rapid rendering of web resources in a browser.

The details of one or more variations of the subject matter described herein are set forth in the accompanying drawings and the description below. Other features and advantages of the subject matter described herein will be apparent from the description and drawings, and from the claims.

DETAILED DESCRIPTION

This current subject matter provides techniques to automated web resource management in real-time during use. In particular, as will be described in further detail below, resource file groupings, orderings, and compression can be based on the usage of the web front-end (i.e., the browser) so that web resource loading performance and server load can be optimized while the user is using the web application. The current subject matter is directed to resolving two main issues: (1) determining real-time resource dependencies looks during use; and (2) optimizing web traffic and reducing server load.

Figure 1:
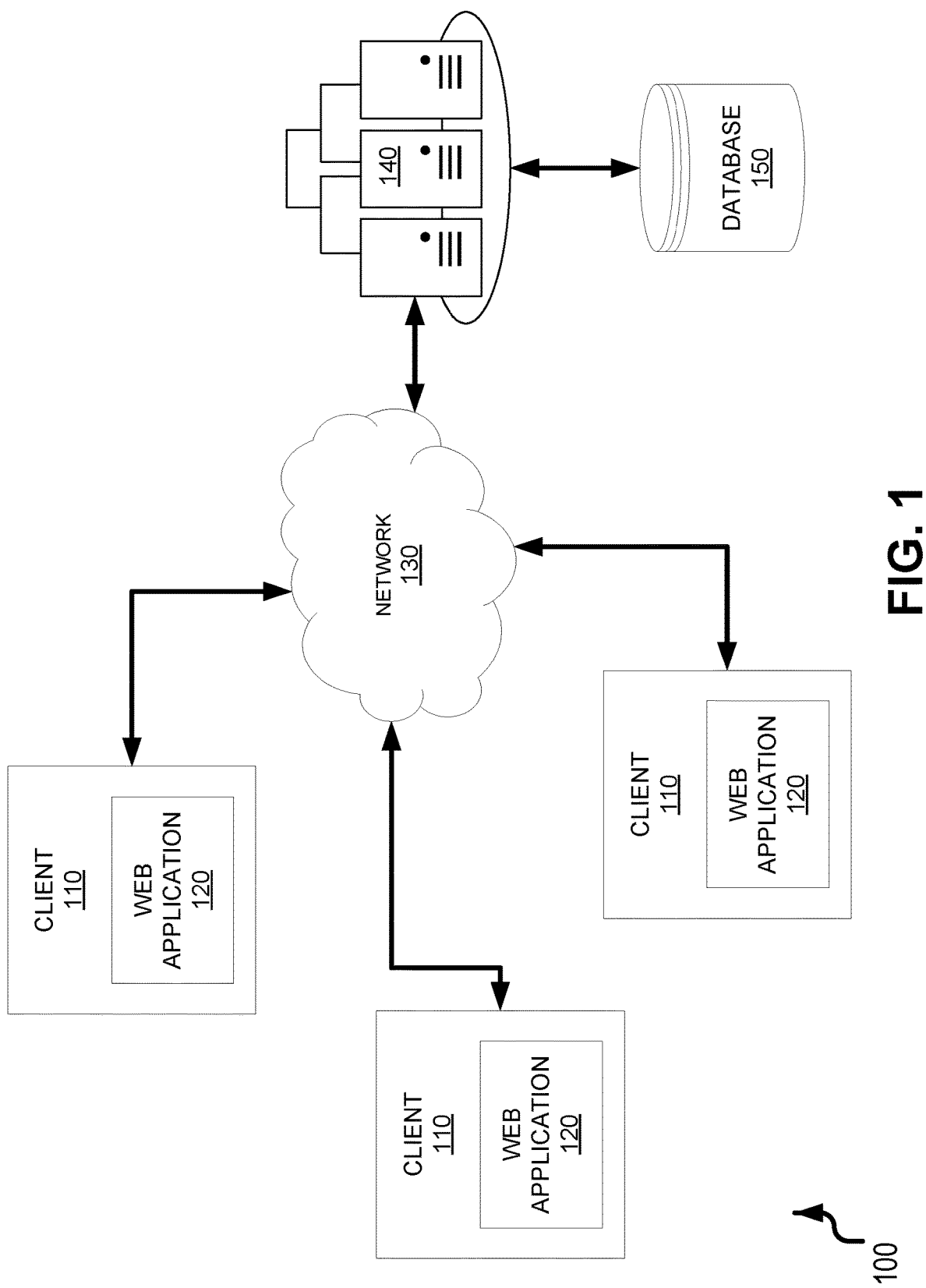
FIG. 1 is a process flow diagram illustrating a computing architecture for a real-time feedback-based web resource management and optimization system.

FIG. 1 is a sample computing architecture in which various clients 110 (i.e., computing devices) each respectively execute an instance of a web application 120. The web application 120 communicates with a data center 140 by way of a network 130. The data center 140, as part of the execution of the application, obtains resource files utilized by the web application which are stored in a database 150 and transmits those resource files to the web application 120. The data center 140, in some instances, can simply be an application server that interfaces with the database 150.

Assuming the web application 120 requires 1000 JAVASCRIPT files which may be selectively utilized depending on a particular view/page being displayed by the web application 120 (in the corresponding browser). The JAVASCRIPT files can each be instrumented (i.e., monitored, etc.) and a usage tag can be added into each corresponding method or JAVASCRIPT global function.

Each page rendered by the web application 120 can require different resources and the pages can specify which resources are to be downloaded from the database 150. Static resources can include JAVASCRIPTS, CSS (typically requiring 10 KBs for roundtrips) images to render UI) and multimedia (which can be optimized by a content delivery network).

Static resources do not have logic showing dependency (i.e., status resources do not indicate any dependency relationship in relation to other resources). A specialized file can specify dependencies (which makes it difficult to identify other static resources because the front end language not self-describing dependencies).

As such, when there are multiple resource files, the dependency relationship among them cannot be determined during runtime. Therefore, no optimizations are available during execution of the web application.

As provided herein, resource files can be modified to include a usage tag. The resource files can be configured to collect information during use of the web application by a user. With JAVASCRIPT, the usage tag can be an identifier. As noted in FIG. 1, when the web application 120 is being used, resource (e.g., JAVASCRIPT file, etc.) usage is collected and submitted to a centralized repository for analysis.

The usage data can be collected in a specialized tracking application (hosted inside of the browser) which runs alongside the instance of the web application 120 at a respective client 110. The specialized tracking application can be kept small and size limited in the memory of the web browser. Based on the collected usage data, dependencies among all utilized resources (e.g., JAVASCRIPT files, etc.) can be generated as a dependencies list.

The dependencies can be identified in various ways. For example, based on page and usage data, a priority list can be generated. The priority list can represent how important or frequently used that web resource (e.g., JAVASCRIPT file, etc.) is used across all pages in the web application 120. Considering the two lists (i.e., dependency list and priority list), final groups of web resources can be calculated that contain co-dependent, high priority web resources (e.g., JAVASCRIPT files, etc.). These groups of web resource can then be placed into a cache pool (at the client 110) for subsequent reuse.

As an example, the web application 120 uses 1000 JAVASCRIPT files. The web application 120 has 1000 pages, and each page gets, on average, receives 100 hits from 100,000 instances (running on various clients 110). Without any optimization, each instance will visit all 1000 pages and download all 1000 JAVASCRIPT files. Various options are available such as: simply caching the 1000 JAVASCRIPT files without optimization, grouping the JAVASCRIPT files into bigger files based on a grouping derived from multiple user's experience, or implementing a dynamic optimization solution.

Table 1 illustrates results for the samples load (say each page holds 20 JAVASCRIPT files ("js" or "JS")), download time is 2 ms per JS (20 KB), 1 ms per request network expense, so the cache hit time (no data transmitted) is 1 ms (just network).

TABLE 1

| Solution | Download hits | Cache hits | Network Time | Server Memory Resource |
| --- | --- | --- | --- | --- |
| Caching only (1) | 1000 * 100000 (3 ms/js) | 1000 * 20 * 100000 | ~2,300,000 seconds | 1000 * 20K = 20 MB |
| Group 20 js | 1000 * 100000 | 1000 * 1 * | ~4,200,000 | 1000 * 20 * |

TABLE 1-continued

| Solution | Download hits | Cache hits | Network Time | Server Memory Resource |
| --- | --- | --- | --- | --- |
| per page (2) | (41 ms/js) | 100000 | seconds | 20K = 400 MB |
| Dynamic optimization (3) | 50 * 100000 (1000 js files = > 50 groups, averagely each page may contains 1.5 groups of file), 41 ms/js | 1000 * 1.5 * 100000 | ~215,000 seconds | 50 * 20 * 20K = 20 MB |

As can be seen, the dynamic optimization provided herein can meaningfully reduce the network transmitting time, include cache hit time as well, and, additionally, reduce all the resource management memory consumption to normal amount.

This system can be componentized into three major parts: data collection service, resource grouping, and resource dispatching.

Data collection service. The data collection service can be an AB service that is provided to a subset of users. The resource files (e.g., JAVASCRIPT files, etc.) can be instrumented so as to make sure each method is tagged, so when such method is executed, it is known which file is being currently executed by which method. The instrumentation can also identify the entity calling the resource file (due to the calling method containing such information). The instrumented files can be dispatched to an instance of the web application 120 of an end user (which can be limited based on a pre-defined policy, e.g. monitoring information is only collected from 1% customers, which is good enough for us to generate those dependencies and priority list). The data obtained via the monitoring can be collected and compressed, based on certain compressed format. For any page that an end user visits via the server, the instrumented scripts can be executed in the user's browser such as js.method1 and js.method2. From this interaction, there are a list of files js and a list of methods: method1(0: index of the js file) and method2(1). As a result, method invocation dependencies are known 0(1)/I meaning methods[0] calling method[1]. Such data is indexed which allows for a high level of compression. This data can then be merged so that it ready as an input for resource grouping.

Resource Grouping. Resource grouping can be used to optimize resource downloading speed and times for both client side 110 and server side (i.e., the data center side 140), while, at the same time, only leveraging limited computing resources to do that. Given all potentially utilized web resources (e.g., JS files, CSS files, etc.), the web resource are group together as a minimal groups, which referenced in pages with maximal counts. As an example, there 10 pages that each have 10 resource files. As such, there are 100 references which are actually only among 20 different files. In a first arrangement, the 20 files can be grouped into 10 groups with each page referring to 5 groups. In a second arrangement, the 20 files can be grouped into 5 groups with each page referring to approximately 3 groups. With the first arrangement, there are 50 references from 10 pages, 10 groups. With the second arrangement, which is more efficient, there are 30 references from 5 groups.

For page reference processing, each page can be modified to include a resource identifier to indicate how many resources it requires. This resource identifier could, for example, comprise multiple groups in the page.

```
<res:group>
./res/a.js
./res/f/b.js
<res:group>
```

Initially, when first rendering the instance of the web application 120, all resource files in all pages will be enumerated. Given that no usage data has been collected, there is an empty grouping policy, so all resources files will be downloaded (and no optimization techniques are applied because they are not available). Once the usage data is obtained, dependencies and priorities can be collected so that dependencies and priority orders can be generated.

In some cases, resource files can reference each other so that they can be part of multiple groups. Such references are referred to herein as circle references. Circle references need to be treated specially when grouping the corresponding resource files. However, linked resource files are not always grouped together in a circle, different groupings can be implemented based on how the resources are organized and used in real end user data.

The grouping process can check all resource files and start calculation iterations (i.e., the above-referenced optimization processes, etc.). The goal of the grouping process is to put all resource files into groups. Various optimizations can be implemented such as reducing the number of groups (optimally to one) and reducing average page download resource size. In addition, duplicated resources can be allowed such that a high priority resource file can form part of multiple groups, in order to balancing the single group/reduced average page download resource size optimizations. Each group resource total size can also have a limit, say 1 MB.

As all page references are handled as provided above, there are new groups and those groups need to be assigned to each page. The two JAVASCRIPT references now become:

```
<res:group>
./_groups/a.jsa
<res:group>
``` so the _groups/a.jsa will contains content of original ./res/a.js and ./res/f/b.js (the content may still be instrumented for further data collection. The instrumentation content is still the same for a.js, and b.js, so instrumentation should only done once. The system will instrument the js file for data tracking, and also provide an original copy in case a need arises to switch back to the original state. The system will cache each resource file version of instrumented and the corresponding original copy.

Resource dispatching. As each web resource page now has a group name, the corresponding resource files can be dispatched via such groups. Such groups, in some cases, can be published and be loaded via different methods (which can depend on a corresponding data center structure).

For datacenters 140 that leverage a static resource gateway or employ a reverse proxy, the resource files can be generated (optionally with versioning information) and such resource files can be dynamically synced to the static resource gateway (or reverse proxy layer) so that a page rendered group resource URL will be served. The reverse proxy can be characterized as a front end server that handle those static resource files (so it already contains the original static resource. The reverse proxy, if it is a simple static resource request, can directly return such resource to the end user. The reverse proxy can dispatch application process requests to an application server. A page rendered group resource URL in this context, refers to the server composing page content to refer to the new groups files (e.g., in page A, it refer 1.js, 2.js, but now it's grouped in z1.js, so the page contains 1.js and 2.js has to be re-composed to update the links references, etc.).

With an application server (not shown), given that a grouping resource has already grouped resources in memory, the resource files can be directed served from the application server. The application server can, in some variations, use a memory cache service for those resource to increase the availability to all services.

Once the resource dispatching is done, a refresh trigger can be done such that the application server is trigger so that the new grouping resources can be used. This refresh trigger, in some variations, can be initiated multiple times so that optimizations can be implemented as more user data is collected.

The grouped resources can also have an option to enable data collection again, so after grouped resource take effective, the instrumented grouped resources will be sent to 1% end users (while other 99% end users will use normal grouped resources). This arrangement can allow for the continued optimization of web performance with newly collected data. Thereafter, such subsequent data collection can be terminated if the final grouped resources mapping is the same output (indicating that the grouping is reaching its limit). If the data center is using a content delivery network (CDN) or other network delivery systems, given that versioned group resources are implemented, resources can be dispatched immediately.

Figure 2:
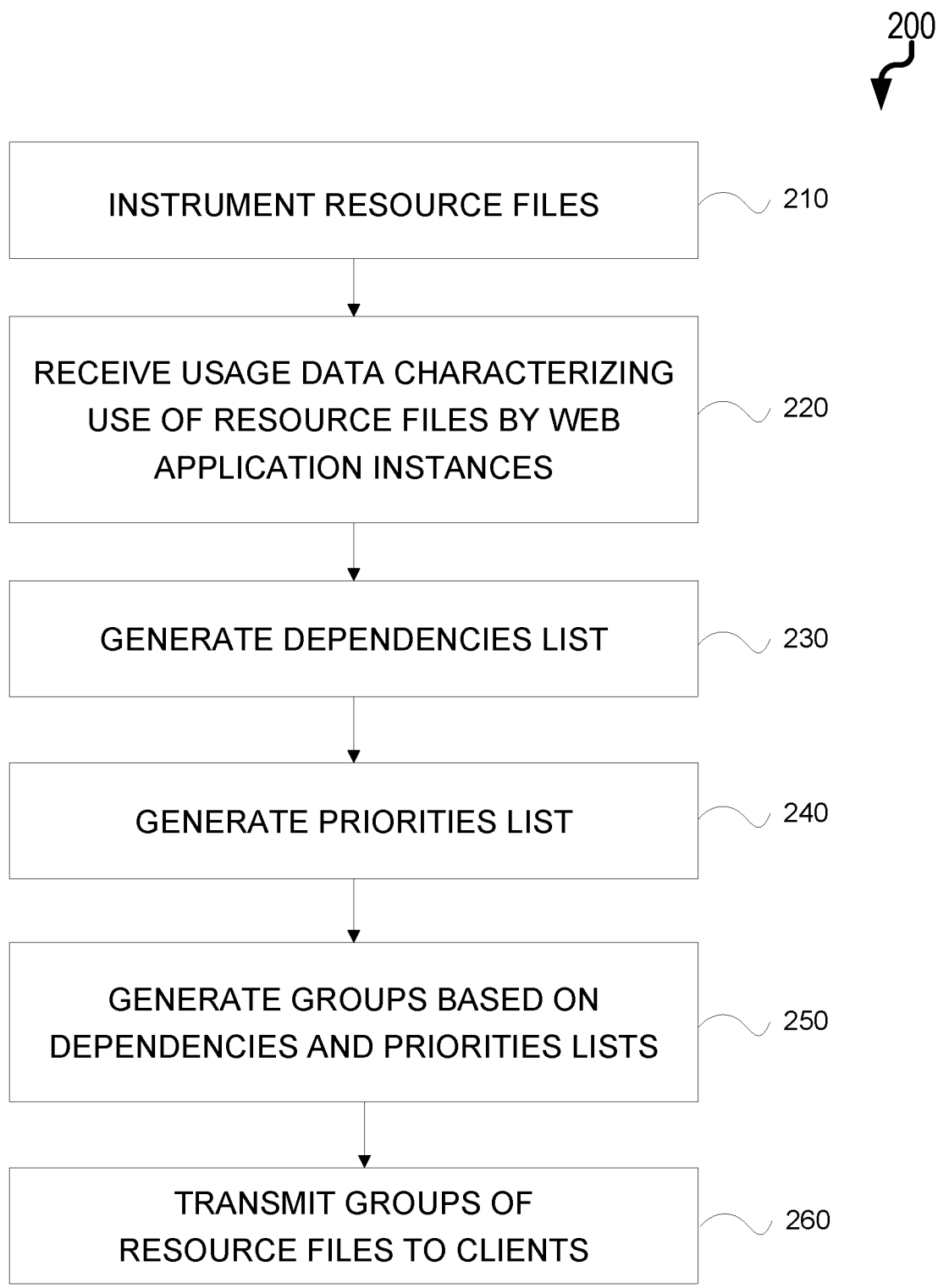
FIG. 2 is a process flow diagram illustrating real-time feedback-based web resource management.
Figure 3:
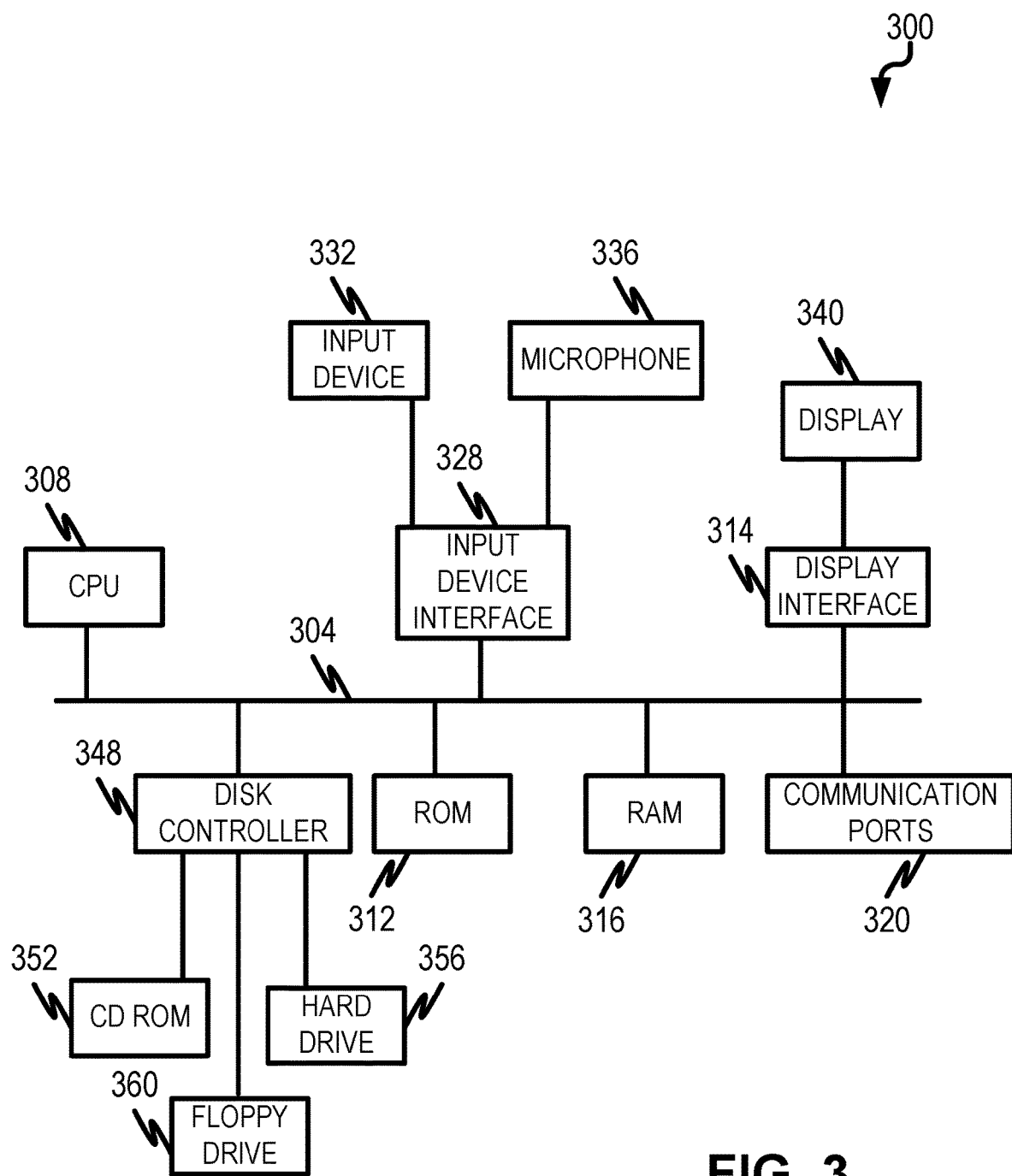
FIG. 3 is a diagram illustrating a sample computing device for implementing aspects of the current subject matter.

FIG. 2 is a process flow diagram 200 in which, at 210, each of a plurality of resource file are instrumented. Usage data of the resource files is received, at 220, from a plurality of clients each executing a different instance of a web application. The usage data of the resource files is collected by the instances of the web application when being used by a respective one of a plurality of users. A dependencies list is generated, at 230, for the resource files based on the received usage data. A priorities list is generated, at 240, for the resource files using the received usage data which indicates how frequently the resource files are being used. Groups of resource files are then generated, at 250, based on co-occurrence levels of the resource files in the dependencies list and the priorities list. Thereafter, at 260, at least a portion of the groups of resource files are transmitted to a client for caching in a local cache pool FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers), can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface with one or more optional disk drives to the system bus 304. These disk drives can be external or internal floppy disk drives such as 360, external or internal CD-ROM, CD-R, CD-RW or DVD, or solid state drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the at least one communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 via a display interface 314 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. The input device 332 and the microphone 336 can be coupled to and convey information via the bus 304 by way of an input device interface 328. Other computing devices, such as dedicated servers, can omit one or more of the display 340 and display interface 314, the input device 332, the microphone 336, and input device interface 328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   instrumenting each of a plurality of resource files downloaded to a web application;
   receiving usage data of the resource files from a plurality of client devices, wherein a respective instance of the web application is executed on each device of the plurality of client devices, and a respective portion of the usage data is collected by the respective instance, as the respective instance is used by a respective user;
   generating a dependencies list for the resource files based on the received usage data;
   generating a priorities list for the resource files using the received usage data which indicates how frequently the resource files are being used;
   generating a group of a plurality of the resource files based on co-occurrence levels of the resource files in the dependencies list and in the priorities list;
   transmitting the group of the plurality of the resource files to a given device of the client devices for caching in a local cache pool at the given device; and
   adding, to a given page utilized by the web application, a resource group identifier that indicates the group is referenced by the given page.

2. The method of claim 1, wherein the resource files comprise JAVASCRIPT files.

3. The method of claim 1, wherein the resource files comprise cascading style sheet (CSS) files.

4. The method of claim 1 further comprising:
   loading, when rendering pages into the web application at a second device of the client devices, a second group of the resource files corresponding to the rendered pages; and
   caching, by the second device, the resource files into a second local cache pool at the second device;
   in at least one case:
      determining, that the resource files required for a subsequently rendered page are present in the second local cache pool; and
      obtaining the required resource files from the second local cache pool.

5. The method of claim 1 further comprising:
   tagging each method used by the web application by adding a tag that identifies, when the method is being executed, which resource file is being utilized by the method and which web application is using the method.

6. The method of claim 1 further comprising:
   publishing a Uniform Resource Locator (URL) of the group of the plurality of the resource files.

7. The method of claim 1, wherein the usage data is continually received and the group is updated based on subsequently received usage data.

8. A system comprising:
   at least one data processor; and
   memory storing instructions which, when executed by the at least one data processor, result in operations comprising:
      instrumenting each of a plurality of resource files downloaded to a web application;
      receiving usage data of the resource files from a plurality of client devices, wherein a respective instance of the web application is executed on each device of the plurality of client devices, and a respective portion of the usage data is collected by the respective instance, as the respective instance is used by a respective user;
      generating a dependencies list for the resource files based on the received usage data;
      generating a priorities list for the resource files using the received usage data which indicates how frequently the resource files are being used;
      generating a group of a plurality of the resource files based on co-occurrence levels of the resource files in the dependencies list and in the priorities list; and
      transmitting the group of the plurality of the resource files to a given device of the client devices for caching in a local cache pool at the given device.

9. The system of claim 8, wherein the resource files comprise JAVASCRIPT files and/or cascading style sheet (CSS) files.

10. The system of claim 8, wherein the operations further comprise:
    loading, when rendering pages into the web application at a second device of the client devices, a second group of the resource files corresponding to the rendered pages; and
    caching, by the second device, the resource files into a second local cache pool at the second device;
    wherein resource files required for a subsequently rendered page are obtained from the second local cache pool when present.

11. The system of claim 10, wherein the operations further comprise:
    tagging each method used by the web application by adding a tag that identifies, when the method is being executed, which resource file is being utilized by the method and which web application is using the method.

12. The system of claim 11, wherein the operations further comprise:
    adding a resource group identifier to each page utilized by the web application, the resource group identifier identifying which group of resource files are required to render the page.

13. The system of claim 8, wherein the operations further comprise:
    publishing a Uniform Resource Locator (URL) of the group of the plurality of the resource files.

14. The system of claim 8, wherein the usage data is continually received and the group is updated based on subsequently received usage data.

15. A non-transitory computer program product storing instructions which, when executed by at least one computing device, result in operations comprising:
    instrumenting each of a plurality of resource files downloaded to a web application;
    receiving usage data of the resource files from a plurality of client devices, wherein a respective instance of the web application is executed on each device of the plurality of client devices, and a respective portion of the usage data is collected by the respective instance, as the respective instance is used by a respective user;
    generating a dependencies list for the resource files based on the received usage data;
    generating a priorities list for the resource files using the received usage data which indicates how frequently the resource files are being used;
    generating a group of a plurality of the resource files based on co-occurrence levels of the resource files in the dependencies list and in the priorities list; and
    transmitting the group of the plurality of the resource files to a given device of the client devices for caching in a local cache pool at the given device.

16. The computer program product of claim 15, wherein the resource files comprise JAVASCRIPT files and/or cascading style sheet (CSS) files.

17. The computer program product of claim 16, wherein the operations further comprise:
   loading, when rendering pages into the web application at a second device of the client devices, a second group of the resource files corresponding to the rendered pages; and
   caching, by the second device, the resource files into a second local cache pool at the second device;
   wherein resource files required for subsequently rendered pages are obtained from the second local cache pool when present.

18. The computer program product of claim 17, wherein the operations further comprise:
   tagging each method used by the web application by adding a tag that identifies, when the method is being executed, which resource file is being utilized by the method and which web application is using the method.

19. The computer program product of claim 18, wherein the operations further comprise:
   adding a resource group identifier to each page utilized by the web application, the resource group identifier identifying which group of resource files are required to render the page; and
   publishing a Uniform Resource Locator (URL) of the group of the plurality of the resource files;
   wherein the group is updated based on subsequently received usage data.

* * * * *